A. R. BANNISTER.
SPEED GEAR FOR MOTOR CYCLES.
APPLICATION FILED DEC. 2, 1915.
1,195,551.
Patented Aug. 22, 1916.
2 SHEETS—SHEET 1.
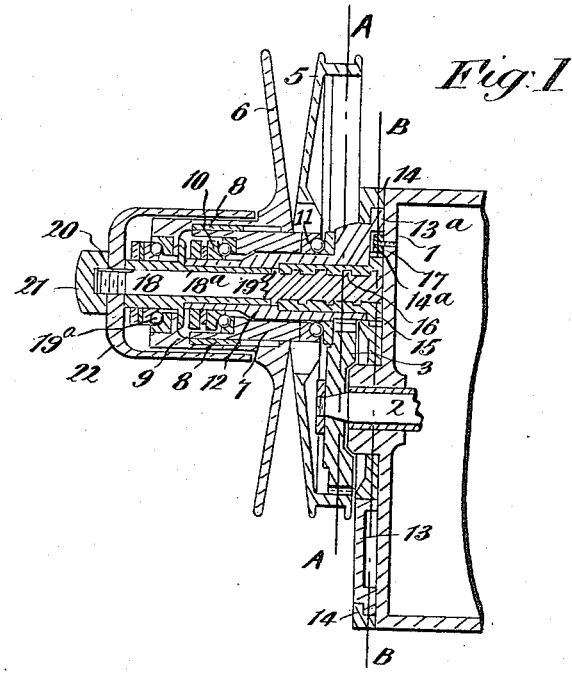
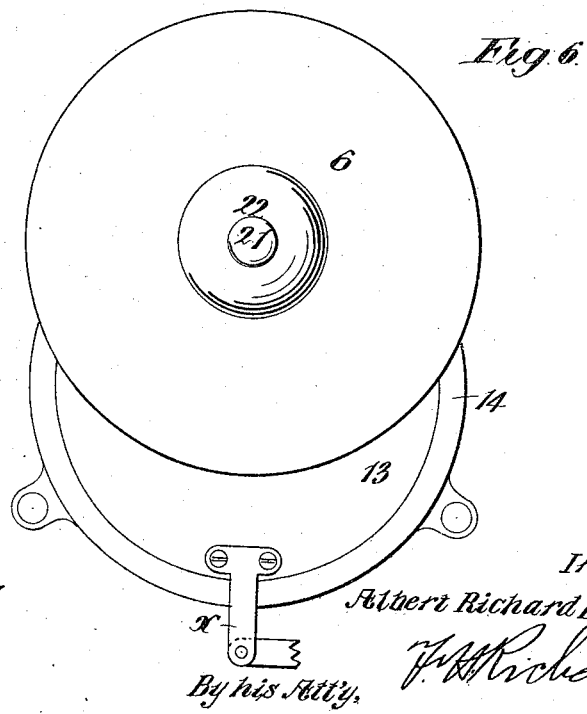

A. R. BANNISTER.
SPEED GEAR FOR MOTOR CYCLES.
APPLICATION FILED DEC. 2, 1915.
1,195,551.
Patented Aug. 22, 1916.
2 SHEETS—SHEET 2.
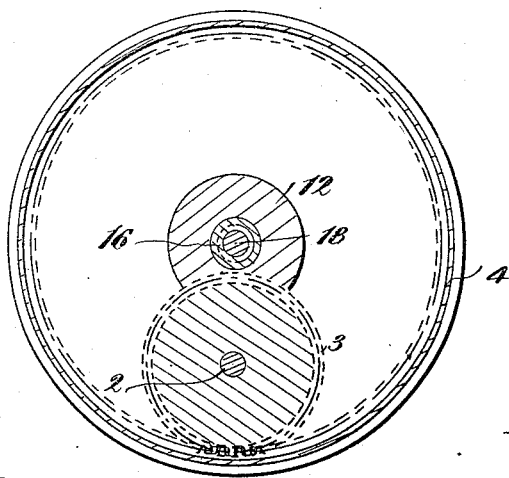
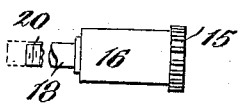
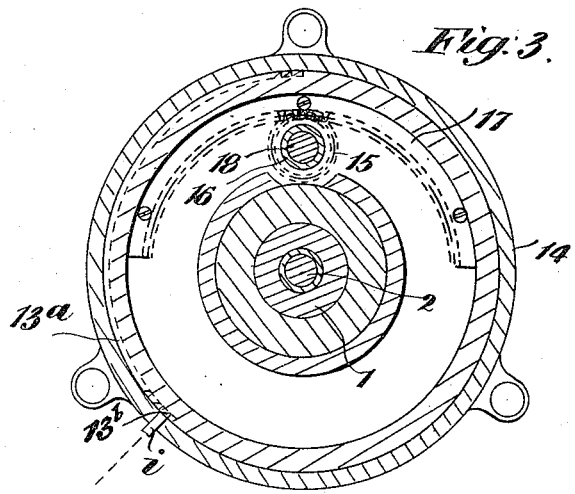
Witnesses:
H. D. Penney
H. O. Siegel
Inventor:
Albert Richard Bannister.
By his Atty, F. H. Richards

UNITED STATES PATENT OFFICE.

ALBERT RICHARD BANNISTER, OF LONDON, ENGLAND.

SPEED-GEAR FOR MOTOR-CYCLES.

1,195,551. Specification of Letters Patent. Patented Aug. 22, 1916.

Application filed December 2, 1915. Serial No. 64,629.

*To all whom it may concern:*

Be it known that I, ALBERT RICHARD BANNISTER, a subject of the King of Great Britain, residing in London, England, have invented certain new and useful Improvements in Speed-Gears for Motor-Cycles, of which the following is a specification.

This invention relates to improvements in and relating to speed gears for motor cycles, and it refers to gears of the type in which an expansible pulley is employed the movable member of which is actuated to vary the speed by means of a screw threaded member, the rotation of said member being controlled by a hand or foot lever, said screwed member after adjustment being secured by a manually controlled pawl and ratchet mechanism.

The present invention has for its primary object to provide an improved arrangement for effecting the primary adjustment of the pulley to suit the length of the belt and for taking up the increase in the length of the said belt due to stretching under wear.

The invention has for its further object to produce a gear which shall be more simple and compact than the bulk of such gears as at present constructed.

In order that the invention may be the better understood, drawings are appended in which:—

Figure 1 is a vertical sectional elevation of the improved gear. Fig. 2 is a section on line AA Fig. 1. Fig. 3 is a section on line BB Fig. 1. Fig. 4 is a side view of the screw threaded member and the nut or sleeve therefor operating the movable member of the pulley. Fig. 5 is an end view of the same. Fig. 6 is a front view of the gear.

Referring to the accompanying drawings, 1 indicates the crank case of the engine and 2 the engine shaft which passes through said crank case and has secured to it a pinion 3 engaging the internally toothed annulus 4 forming part of the non-slidable member 5 of the pulley, 6 indicates the sliding member thereof. The bases of the members of the pulley interlock in the usual manner. The member 5 is provided with a sleeve 7 upon which is secured, by means of splines, of which one only, 8, is shown, a second sleeve 9 forming part of the slidable member 6 of the pulley. The sleeve 7 is revolubly mounted by means of ball bearings 10 11 upon the tubular extension 12, forming part of the plate 13, which plate is clamped by means of the annular body 14 to the exterior of the crank case 1, the attachment, however, being such as will permit the plate 13 to be rotated as will hereafter be more fully explained. The plate 13 has upon its periphery a series of ratchet teeth $13^a$ with which engages a pawl $13^b$, the purpose of the said teeth and pawl being to retain the plate 13 after its adjustment has been effected. The withdrawal of the pawl $13^b$ may be conveniently effected from the handle bar of the machine by means of a Bowden wire. The base of the extension 12 has formed at its inner end a recess, designed to contain a pinion 15 formed at the inner end of the internally screw-threaded sleeve or nut 16. The pinion 15 engages a toothed sector 17, as shown in Fig. 3, which sector is secured in any convenient manner to the outer surface of the crank case. Engaging the sleeve 16, and abutting at its inner end against the crank case, is a screw-threaded spindle 18 provided with a collar at 19 against which collar one end of the sleeve $18^a$ hereafter referred to abuts. Surrounding the outer end of the spindle 18 is the sleeve $18^a$, which sleeve is slidably keyed to the tubular extension 12 of plate 13 before referred to, and is normally clamped between collar 19 and the member 12 so that said sleeve and the spindle 18 are in effect in one. The sleeve 9 of slidable member 6 of the pulley is provided at its outer end with a ball bearing $19^a$, one race of which is carried by the above mentioned sleeve $18^a$. The spindle 18 is provided at the point 20 with a flat surface, so that the sectional outline of the end of the spindle is D shaped and it has secured to it by means of a nut 21 the bell shaped member 22 inclosing the outer ends of the various sleeves and forming a cap whereby not only can the primary adjustment of the member 6 be readily effected by removing nut 21 but the entry of dust and other injurious matter is prevented. The cap 22 is clamped by the nut against the end of sleeve $18^a$ and by removing same ready access is obtained to the mechanism, as when the nut 21 is slackened the parts can be rotated to effect the adjustment of the belt tension. The variation in the speed is effected by swinging the member carrying the spindle, the movement of said member being effected by means of a foot or other lever connected through a system of rods and levers to said member at *x* or in any convenient manner.

The operation of the gear is as follows:— To effect the primary adjustment in order to secure the proper tension upon the belt the nut 21 is turned to free sleeve 18ª, the cap 22 rotated, and with it the spindle 18, in one or other direction, whereby the slidable member 6 is positioned to secure the necessary driving tension of the belt, and the nut 21 is then tightened. Motion is imparted to the driving pinion 3, the said pinion engaging the internal teeth upon the member 6 of the pulley causes both members of said pulley and the parts associated therewith to rotate, the sleeve 12, disk 13, spindle 18 and nut 16, 18ª and cap 22, remaining stationary. When it is desired to alter the gear, the foot pedal is operated, turning plate 13, the pawl 13ᵇ riding over the teeth 13ª on the plate 13 until said plate comes to rest when the pawl secures the said plate against further movement. The withdrawal of the pawl by means of the aforesaid Bowden wire frees plate 13, which under the pull of the belt is caused to return until the pawl is again engaged with the ratchet teeth. The rotation of the screwthreaded sleeve 16 during the movement of the disk 13 is effected by the fixed sector 17 engaging the pinion 15 of the said sleeve. By this means the longitudinal movement of the spindle 18 is effected, and the desired variation in the position of the sliding member of the pulley with respect to the non-sliding member, is secured.

The pitch of the screw upon spindle 18 is so designed that, when upon the high speed, the belt is loose, being tight upon the low gear. The looseness of the belt upon the high gear insures smooth running, and owing to the large diameter of the pulley objectionable slipping of the belt is avoided. The arrangement of the thread of the nut and spindle causes a gradual increase in tension as the speed ratio of the gear is increased, in other words the smaller the surface of contact for the belt upon the pulley the greater the tension of the said belt. If the belt tension remained the same at all positions of the belt pulley the tension necessary to prevent slipping upon the lower speeds would, if maintained through all positions of the pulley, cause a very harsh drive on the highest speed, particularly if the engine were running at a low speed.

It will be evident from the foregoing that by arranging the parts of the gear in the manner described and illustrated, it is possible to bring the driving pulley much closer to the crank case than is the case with the bulk of gears of the type as at present constructed. By this means the point at which the strain falls upon the parts is also brought closer to the point of attachment to the crank case, the result being that the gear is generally much stronger and less subject to wear than would otherwise be the case.

I claim:

1. In a change speed gear for motor cycles, a pulley comprising a fixed member and an adjustable member, gearing connecting said pulley with a motor shaft, means for adjusting the adjustable member of the pulley comprising a screwed spindle, a nut fixed against longitudinal movement, means for rotating said nut, a member revoluble upon and moving with the screwed spindle, and a second member capable of rotation independently of the first member and connected to the sliding member of the adjustable pulley.

2. In a change speed gear for motor cycles, a pulley comprising a fixed member and an adjustable member, gearing connecting said pulley with a motor shaft, means for adjusting the adjustable member of the pulley comprising a screwed spindle, a nut fixed against longitudinal movement, means for rotating said nut, a member revoluble upon and moving with the screwed spindle, a second member capable of rotation independently of the first member connected to the adjustable member of the pulley, a cover for the second member, and a nut upon the end of the screwed spindle clamping said cover to the second movable member.

3. In a change speed gear for motor cycles, a pulley comprising a fixed member and an adjustable member, gearing connecting said pulley with a motor shaft, a screwed spindle, a swinging member carrying said spindle, a nut for said spindle, a pinion upon said nut, a fixed sector engaging said pinion, means for swinging the pulley to rotate the nut, means for holding the nut against longitudinal movement, means for holding the swinging member after adjustment, a member revoluble upon and moving with the screwed spindle, and a second member, capable of rotation independently of the first member and connected to the adjustable member of the pulley.

4. In a change speed gear for motor cycles, a pulley comprising a fixed member and an adjustable member, gearing connecting said pulley with a motor shaft, a screwed spindle, a swinging member carrying said spindle, a nut for said spindle, a pinion upon said nut, a fixed sector engaging said pinion, means for swinging the pulley to rotate the nut, means for holding the nut against longitudinal movement, means for holding the swinging member after adjustment, a member revoluble upon and moving with the screwed spindle, a second member, capable of rotation independently of the first member, connected to the adjustable member of the pulley, a cover for said second member, and a nut upon the end of the screwed member clamping said cover to said first member.

5. In a change speed gear for motor cycles, a pulley comprising a fixed member and an adjustable member, gearing connecting said pulley with a motor shaft, a screwed spindle, a nut therefor, a pinion upon said nut, a swinging member carrying the pulley, means for securing said member, a fixed sector engaging the pinion upon the nut, a bearing for the nut, a collar upon the screwed spindle, a sleeve slidably mounted upon the spindle, a collar upon said sleeve, a sleeve associated with the fixed member of the pulley, a second sleeve associated with the adjustable member of the pulley, and a connection between the latter sleeve and the sleeve upon the screwed spindle whereby the said second sleeve is caused to move longitudinally of the spindle and is independently revoluble.

6. In a change speed gear for motor cycles, a pulley comprising a fixed member and an adjustable member, gearing connecting said pulley with a motor shaft, a screwed spindle, a nut therefor, a pinion upon said nut, a swinging member carrying the pulley, means for securing said member, a fixed sector engaging the pinion upon the nut, a bearing for the nut, a collar upon the spindle, a collar upon said sleeve, a sleeve associated with the fixed member of the pulley, a second sleeve associated with the adjustable member of the pulley and a connection between the latter sleeve and the sleeve upon the screwed spindle whereby the said second sleeve is caused to move longitudinally of the spindle and is independently revoluble, a cover for the sleeve associated with the sliding member of the pulley, and a nut upon the end of the screwed spindle clamping said cover to the sleeve upon the screwed spindle.

7. In a change speed gear for motor cycles, a pulley comprising a fixed member and an adjustable member, gearing connecting said pulley with a motor shaft, a screwed spindle, a nut therefor, a pinion upon said nut, a swinging member carrying the pulley, means for securing said member comprising ratchet teeth formed upon the member carrying the sector, a pawl engaging said ratchet teeth and means for operating said pawl to free it of the teeth, a fixed sector engaging the pinion upon the nut, a bearing for the nut, a collar upon the screwed spindle, a sleeve slidably mounted upon the spindle, a collar upon said sleeve, a sleeve associated with the fixed member of the pulley, a second sleeve associated with the adjustable member of the pulley, and a connection between the latter sleeve and the sleeve upon the screwed spindle whereby the said second sleeve is caused to move longitudinally of the spindle and is independently revoluble, a cover for the sleeve associated with the sliding member of the pulley, and a nut upon the end of the screwed spindle clamping said cover to the sleeve upon the screwed spindle.

In witness whereof I have hereunto affixed my signature in the presence of the undersigned witnesses.

ALBERT RICHARD BANNISTER.

Witnesses:
JOHN H. JACKE,
J. D. SISSIT.

Copies of this patent may be obtained for five cents each, by addressing the "Commissioner of Patents, Washington, D. C."